3,494,943
NOVEL 9α-FLUORO-11β, 17α, 21-TRI-HYDROXY-16-HYDROXYMETHYL - 6-(DIHYDROXY) METHYL-1,4-PREGNADIENE-3,20-DIONES AND DERIVATIVES THEREOF
George Krsek, Los Angeles, Calif., assignor to Rachelle Laboratories, Inc., Long Beach, Calif.
No Drawing. Filed Dec. 29, 1967, Ser. No. 694,426
Int. Cl. C07c *169/34;* A61k *17/00*
U.S. Cl. 260—397.45                8 Claims

ABSTRACT OF THE DISCLOSURE

Novel 6-(dihydroxy) methyl-16-hydroxymethyl derivatives of 9a-fluoroprednisolone are disclosed which are useful as topical and systemic anti-inflammatory agents.

FIELD OF THE INVENTION

The present invention relates to novel anti-inflammatory steroids.

DESCRIPTION OF THE PRIOR ART 16-substituted, 6-substituted and 6,16-substituted derivatives of 9a-fluoro-prednisolone are known in the art as anti-inflammatory agents. However, heretofore, no compounds have been prepared in this series which carry a (dihydroxy)-methyl group at the 6-position of the steroid nucleus.

SUMMARY

The present invention relates to 9a-fluoro-11b,17a,21-trihydroxy-16-hydroxymethyl-6-(dihydroxy)methyl - 1,4-pregnadiene-3,20-diones of general Formula A.

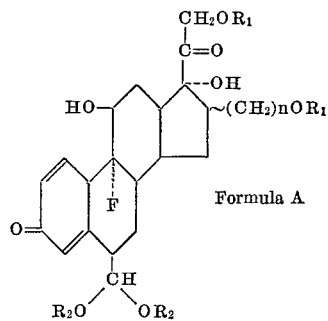

Formula A

Wherein $R_1$ may be hydrogen, alkyl, or alkanoyl. $R_2$ may similarly be hydrogen, alkyl, or alkanoyl. The groups $R_1$ and $R_2$ may be the same or different. $n$ is an integer having the value 0 to 1.

The compounds of the present invention may suitably be prepared in accordance with the reaction scheme indicated herein below:

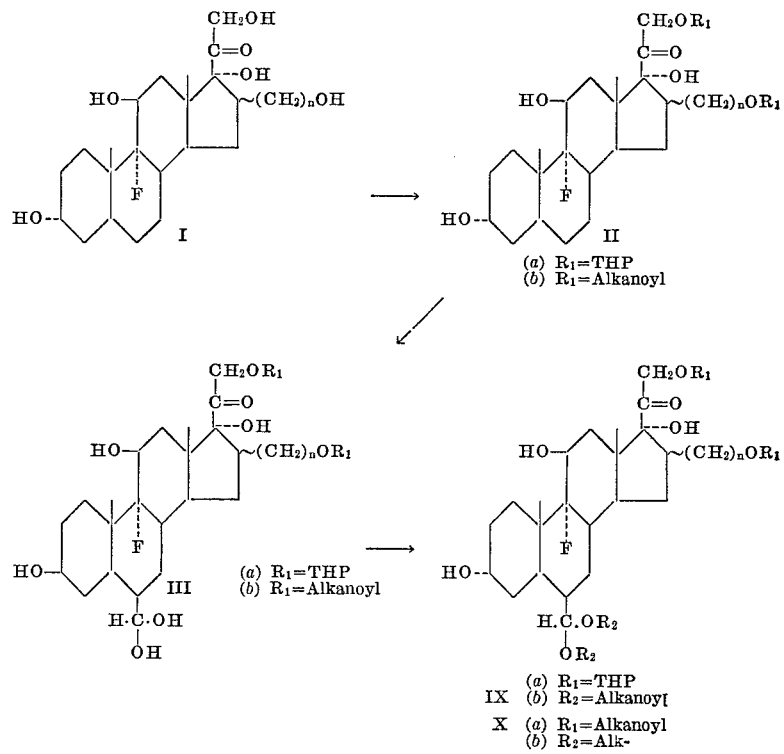

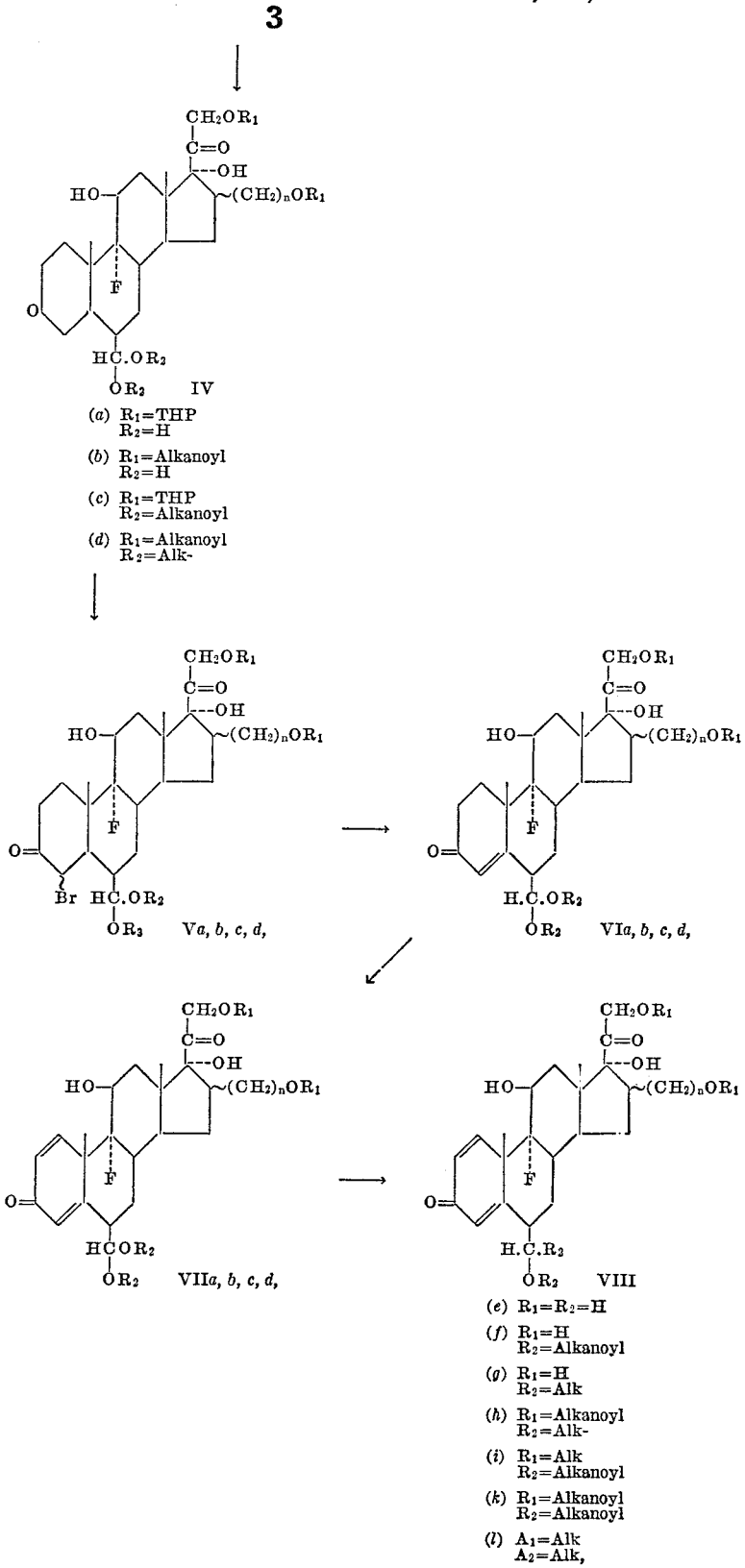

(a) R₁=THP
    R₂=H
(b) R₁=Alkanoyl
    R₂=H
(c) R₁=THP
    R₂=Alkanoyl
(d) R₁=Alkanoyl
    R₂=Alk- (e) R₁=R₂=H
(f) R₁=H
    R₂=Alkanoyl
(g) R₁=H
    R₂=Alk
(h) R₁=Alkanoyl
    R₂=Alk-
(i) R₁=Alk
    R₂=Alkanoyl
(k) R₁=Alkanoyl
    R₂=Alkanoyl
(l) A₁=Alk
    A₂=Alk, In Compounds V—VII($a$, $b$, $c$ and $d$), the groups $R_1$ and $R_2$ have the same significance as in Compounds IV$a$, $b$, $c$ and $d$, respectively.

As a typographical convenience, in the designation of stero orientation in the chemical names of compounds herein, the following equivalencies should be read throughout, a=α, b=β.)

A suitable starting material is 9a-fluoro-3a,11b,17a, 21-tetrahydroxy - 16-hydroxymethyl-pregnan-20-one (Compound I). Depending upon the nature of the ultimate product desired, the starting material is either acylated at the 21-, and 16-hydroxymethyl side chain positions, or the 16-tetrahydropyranyloxymethyl 21-tetrahydropyranyl ether derivative prepared, (Compounds II$b$ or $a$). The compound of General Formula II is then reacted under pressure with hydrogen and carbonmonoxide in the presence of cobalt carbonyl to yield the corresponding acyloxy or tetrahydropyranyl derivatives of 9a-fluoro-3a, 11b, 17a, 21 - tetrahydroxy - 16 - hydroxymethyl - 6 - (dihydroxy) methyl-pregnan-20-one (Compound III$b$, $a$).

Where it is desired to obtain a final product wherein $R_1$ is hydrogen and $R_2$ is alkanoyl the reaction scheme recited hereinabove is carried through with compounds wherein $R_1$ is initially tetrahydropyranyl. Compound III$a$ is then acylated to yield the 9a-fluoro-6-(diacyloxy) methyl-3a, 11b, 17a-trihydroxy-16-tetrahydropyranyloxymethyl-pregnan-20-one 21 tetrahydropyranyl ether (Compound IX).

The A ring of this nucleus is then oxidized to yield the corresponding 1,4-pregnadiene-3,20-dione (Compound VII$a$, $b$, $c$ or $d$). This oxidation may be conveniently carried out in two stages. In the first stage Compound III is subjected to an Oppenauer oxidation to yield the corresponding 9a-fluoro-11b, 17a, 21-trihydroxy-16-hydroxymethyl-6-(dihydroxy)-methyl-pregnan-3,20 dione derivative (Compound IV$a$, $b$, $c$ or $d$). The A ring of Compound IV is then dehydrogenated to give the corresponding 4-pregnene, suitably by 4-bromination followed by dehydrobromination. The 1,2-double bond is then inserted either by chemical means, such as selenium dioxide dehydrogenation or by microbiological dehydrogenation, such as subjecting the compound to a fermentation containing organisms such as *Corynebacterium simplex* or the like. This is then followed by the ring A oxidation steps as set forth above and characterized by Compounds IV$c$–Compounds VII$c$. This is followed by treatment with mineral acid to remove the tetrahydropyranyl-protecting group to yield 9a-fluoro-6-(diacyloxy)methyl-11b, 17a, 21-trihydroxy - 16 - hydroxymethyl-1,4-pregnadiene-3,20-dione (Compound VIII$f$).

Where it is desired to produce a compound wherein $R_1$ is hydrogen and $R_2$ is alkyl, the main reaction series is carried out, starting with a compound wherein $R_1$ is alkanoyl. Compound III$b$ is then reacted with the appropriate alcohol in the presence of an acid to yield the corresponding 9a - fluoro - 6 - (dialkoxy)methyl-16-acyloxymethyl-3a-11b, 17a, 21 tetrahydroxy-pregnan-20-one 21-acylate (Compound X). This is then followed by the Ring A oxidation steps as set forth above and characterized by Compounds IV$d$–Compounds VII$d$. This product is then subjected to alkaline hydrolysis to remove the acyloxy groups to yield the desired 9a-fluoro-6-(dialkoxy)methyl 11b, 17a, 21 - trihydroxy - 16-hydroxymethyl-1,4-pregnadiene-3,20-dione (Compound VIII$g$).

Where $R_1$ and $R_2$ are both to be Hydrogen Compound (VII$a$ or $b$) is hydrolysed to yield the desired product (VIII$e$).

Also within the scope of the present invention are compounds wherein $R_1$ and $R_2$ are the same and other than Hydrogen, Compound (VIII$e$, $f$ or $g$), as produced according to the methods shown hereinabove, is then reacted with either an acylating agent or an etherfying agent in the regular manner to give Compounds VII$h$–$l$.

PHARMACEUTICAL UTILITY

The compounds of the present invention are useful as anti-inflammatory agents. They may administered orally, or parenterally i.e., by subcutaneous or intramuscular injection, or they may be used as a topical anti-inflammatory agent in the form of sprays or ointments. The preferred dosage amounts range in the order of five to thirty milligrams of the steroid component per dose, and similarly the concentration of the active steroid is of the order of five to thirty milligrams of steroid per gram or mililiter of carrier. Suitable dosage formulations are set forth hereinbelow.

PREFERRED EMBODIMENTS

In the preferred embodiments of the present invention, the substituent groups in the compound of Formula A have the following significance:

$R_1$ or $R_2$ may be hydrogen, lower alkyl, preferably containing between 1 and 6 carbon atoms, such as methyl, ethyl, propyl, butyl and the like; lower alkanoyl, suitably containing between 1 and 6 carbon atoms, such as, formyl, acetyl, propionyl, valeryl, or the like, acetyl and valeryl, being especially preferred.

While this invention includes compounds wherein $n$ has the significance 1 and 0, the compounds wherein $n$ is 1 are preferred.

Where it is desired to produce a 9a-fluoro-16 alkanoyloxymethyl - 3a,11b,17a,21 - tetrahydroxy-pregnan-20-one (Compound II$b$), 9a-fluoro-3a,11b,17a, 21-tetrahydroxy-16-hydroxymethyl pregnan-20-one (Compound I) is taken up pyridine and a solution of acetic anhydride in pyridine added thereto. Since it is important that the 3a-hydroxy group be not acylated, this acetylation must be carried out under extremely mild conditions. It is preferred to use a small excess of acylating agent, that is to say, slightly more than two equivalents of acetylating agent per mole of steroid. It is also preferred that the reaction be carried out at room temperature, that is to say, from about 5° to about 15° C. for a period of about 10 to 24 hours. Upon completion of the reaction, the acylating agent is removed by evaporation under reduced pressure, the residue taken up in a suitable organic solvent, such as, ethyl acetate or chloroform and water, and the organic layer separated and worked up to yield the desired product, Compound II$b$.

Where it is desired to produce the corresponding tetrahydropyranyloxy derivatives, Compound I is taken up in a suitable organic solvent, for example, benzene utilizing as small a quantity as is compatible with complete solution, a small excess of tetrahydropyranyl alcohol added thereto together with a trace of acid catalyst. It is preferred to use slightly more than two equivalents of tetrahydropyranyl alcohol per mole of steroid, and to utilize a strong organic acid such as, toluenesulfonic acid, as the catalyst. The mixture is heated under reflux for from 6 to 12 hours, cooled, the organic layer washed with water, and worked up in the usual manner to yield a compound of Compound II$b$.

In the next stage of the reaction, cobalt carbonyl is prepared by heating Raney cobalt in ether under pressure of carbonmonoxide of the order of 2500 to 3500 lbs. per sq. inch for a period of from about 4 to about 7 hours at a temperature of from about 130° to 160° C.

Compound II is then taken up in ethanol, a solution of between three and ten percent being suitable, and there is added thereto a portion of the previously prepared solution of cobalt carbonyl, containing slightly less than ½ of the amount by weight of the steroid compound. The mixture is placed in an autoclave, into which is introduced carbonmonoxide at a pressure of between 2500 and 3500 lbs. per sq. inch. The pressure is then raised by a further 1000 to 1500 lbs. per sq. inch of hydrogen to give a total pressure of from about 4000 to about 5500 lbs. per square inch, preferably in the area of 4800 lbs. per sq. inch. The mixture is agitated for from about 10 to about 30 minutes, heated to from about 80° to about 120° C., held at that temperature for approximately 15 minutes, cooled to ambient temperature, the pressure released, and the resultant mixture clarified by filtration. The solvents are removed from the filtrate by evaporation under reduced pressure and the residue recrystallized, suitably from a lower alkanol, such as ethanol, to yield the desired 6-dihydroxymethyl steroid (Compound III).

In order to prepare the 6-(dialkanoyloxy)21-hydroxy 16-hydroxymethyl derivatives (Compound VIII$f$) the corresponding 16-tetrahydropyranyloxymethyl 21-tetrahydropyranylether (Compound III$a$) is taken up in a solution of the acylating agent, for example, acetylchloride, propionylchloride, valerylchloride, or the like, in a tertiary amine, suitably pyridine. A small excess of acylating agent is desirable, that is to say, slightly more than two equivalents of acylating agent per mole of steroid. The mixture allowed to stand at ambient temperature for from about 6 to about 12 hours, and the solvents evaporated under reduced pressure. The residue is taken up in a water-immiscible organic solvent ethyl acetate or chloroform being especially suitable and washed with saturated aqueous sodium bicarbonate. This washing will serve not only to remove any residual pyridine, but will also preserve the tetrahydropyranyl ether moieties so that upon work-up of the organic layer, there is yielded the 9a-fluoro-6-(dialkanoyloxy)methyl-11b,17a,21-trihydroxy-16-tetrahydropyranyloxy-methyl-pregnan - 3,20 - dione 21-tetrahydropyranyl ether (Compound IX).

In order to produce the corresponding 6-(dialkoxy) methyl 21-hydroxy 16-hydroxymethyl derivatives (Compound VIII) 9a-fluoro-16-alkanoyloxymethyl-11b,17a,21-trihydroxy-6-(dihydroxy)methyl pregnan-3,20-dione 21-alkanoate (Compound IIIb) is mixed with a small excess of the correspondingly desired alkanol, suitably slightly more than 2 equivalents per mole of steroid, for example ethanol, propanol, butanol, and the like, to which there is added a trace of a strong acid, suitably a strong organic acid such as toluenesulfonic acid, or benzene sulfonic acid, and the mixture heated with an organic solvent, capable of forming a water-solvent azeotrope with water. Such solvents would include chloroform, benzene, or toluene and should be chosen so that the boiling point of the azeotrope is somewhat lower than the boiling point of the alcohol being used. The heating is continued until no further azeotrope is noted as being formed, and the solvents removed by evaporation under reduced pressure. The residue is taken up in a water immiscible organic solvent, which upon evaporation yields the intermediate 9a-fluoro-16-alkanoyloxymethyl-6-(dialkoxy)methyl- 11b, 17a,21 - trihydroxy - pregnane - 3,20 - dione 21 -alkanoate (Compound X).

The 3a-hydroxy group of Compounds IX or X is now suitably oxidized to the corresponding 3-keto group. It is preferred to carry out this procedure by means of the Oppenauer reaction. Compound IX or X is taken up in toluene, and a small excess of aluminum isopropoxide, and cyclohexanone is added thereto. The mixture is heated under reflux for about thirty to sixty minutes, cooled, quenched with water or preferably dilute mineral acid, and the desired 3 keto-steroid, Compound IV isolated from the organic layer.

The A ring of Compound IV is then dehydrogenated. The compound is taken up in glacial acetic acid and treated with a solution of bromine suitably about 0.25 M, in glacial acetic acid at ambient temperatures. The product is then isolated. Evaporation of the solvent and extraction with a suitable water immiscible solvent yields, upon evaporation, the corresponding substituted 4ƒ-bromo-11b, 17d, 21-trihydroxy-6-(dihydroxy)methylpregnan - 3,20 - dione (Compound V) derivatives.

This Compound (V) is then taken up in acetic acid and heated with semicarbazide hydrochloride suitably to from 1 to 3 hours at from about 60° to about 80° under an inert atmosphere for example under nitrogen. The reaction mixture is then treated with pyruvic acid and heated for a similar time under similar conditions to yield the corresponding 11b, 17a,21-trihydroxy - 6 - (dihydroxy) methyl-4-pregnene-3,20 - dione derivatives (Compound VI).

The 1,2-double bond is then inserted. This may be achieved chemically or, preferably, by fermentation. Chemical dehydrogenation may be carried out, using dichlorodicyanoquinone, or more suitably, selenium dioxide. The reactants are taken up in N-butanol, and heated under reflux for about 30 to about 60 minutes. The reaction mixture is then cooled, the solvent removed by evaporation under reduced pressure, and the residue taken up in a non-hydroxylic organic solvent, ethylacetate or chloroform being especially suitable, from which the desired product is isolated upon evaporation of the solvent. The recrystallization suitably from a lower alkanol yields the desired 9a-fluoro-11b,17a,21 - trihydroxy - 16 - acyloxy - methyl-6-(dihydroxy)methyl-1,4-pregnadiene - 3,20 dione 21-acylate (Compound VIId). In the microbiological procedure Compound VId or c is added to a fermentation of, suitably, Corynebacterium simplex, to yield the corresponding 16-acyloxymethyl 6-(dialkoxymethyl) 21acylate (Compound VIId) or the 21 tetrahydropyranyl-16-tetrahydropyranyloxymethyl analog thereof (Compound VIIc).

In order to obtain a desirable growth of Corynebacterium simplex (American Type Culture Collection 6946), a suitable nutrient medium is prepared containing carbohydrate, organic nitrogen, cofactors, and inorganic salts. It is possible to omit the use of carbohydrate without completely impairing the growth of the organism. The steroid compound as a solid or dissolved or suspended in ethanol, acetone or any other watermiscible solvent which is non-toxic toward the organisms, is added to the cultivated microorganism in a broth medium under sterile conditions. This culture is then shaken, aerated, or simultaneously aerated and agitated, in order to enhance the growth of the Corynebacterium simplex and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid. Alternatively, enzyme preparations obtained in known manner from cultures of Corynebacterium simplex may be used for carrying out the process.

A useful method for carrying out the process is the cultivation of Corynebacterium simplex on a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco) casein hydrolysate (N-Z-Amine) (Type B Sheffield), corn steep liquor, water extract, of soybean oil meal, lactalbumin hydrolysate (Edamine-Sheffield Enzymatic), fish solubles, and the like.

Inorganic salts are desirable to maintain a pH level in the reaction medium of between 6.8 and 7.2. However, the use of inorganic salts for buffering the reaction mixture may be omitted. The omission of inorganic salts causes the pH to rise from an initial value of 6.8 to about 7.7. This, however, will still permit the formation of the desired steroidal and products. The optimum temperature for growth of the selected microorganism is 37° C., but the temperatures may vary between 25° and 37°, and even between 20° and 40° C. The time of reaction may vary from as little as 3 hours to as much as 48 hours. The length of time which is employed will depend on the steroid which is being transformed. Any water miscible, non-toxic (to the organism) solvent may be employed to dissolve or suspend the steroid. I prefer to use ethanol or acetone in such amounts that the final concentration of these solvents in the reaction mixture is no higher than about 7% and may amount to only traces; owing to evaporation, the final concentration of the organic solvent may even be practically zero. There are thus produced the Compounds VIIa, b, c or d. The protecting groups not desired in the final product are then removed.

Where $R_1$ is alkanoyl and $R_2$ is hydrogen for example 9a - fluoro - 11b,17a,21 - trihydroxy - 6 - (dihydroxy)methyl - 16 - tetrahydropyranyloxymethyl - 1,4 - pregnadiene - 3,20 - dione 21 - tetrahydropyranylether is taken up in benzene and agitated with strong mineral acid, suitably 5 N hydrochloric acid for from about 2-5 hours at ambient temperature, the benzene layer washed with water, dried and evaporated under reduced pressure to yield 9a - fluoro - 11b,17a,21 - trihydroxy - 16 - hydroxymethyl - 6 - dihydroxymethyl - 1,4 - pregnadiene - 3,20 - dione (VIIIe).

Where it is desired to form the same compound starting with a Compound VIIb or to form a Compound VIII g, the corresponding 9a - fluoro - 16 - alkanoyloxymethyl-11b,17a,21 - trihydroxy - 6 - (dihydroxy)methyl - 1,4 - pregnadiene - 3,20 - dione 21 alkanoate (Compound VIIb) or the 6 - dialkoxy derivative thereof (Compound VIId) is then taken up in a lower alkanol, suitably a lower ankanol containing therein a solution of the corresponding alkoxide. Solutions of methanol containing sodium or potassium methoxide or ethanol containing sodium or potassium ethoxide are especially suitable. Alternatively, the steroid may be taken up in a non-hydroxylic organic solvent, such as benzene, to which has been added a suitable excess amount of an alkali metal alkoxide, such as those named above or sodium-butoxide. The mixture is then heated under reflux for a period of from about 6 to about 24 hours; cooled, the solvents are removed by evaporation under reduced pressure and the solid residue partitioned between a mixture of water and a water immiscible solvent, suitably chloroform or ethyl acetate. Work-up of the organic layer yields the desired Compound VIIIe or 9a - fluoro - 6(dialkoxymethyl) - 11b,17a,21 - trihydroxy - 4 - 16 - hydroxymethyl - 1,4-pregnadiene - 3,20 - dione (Compound VIIg). To yield 9a - fluoro - 6(dialkanoyloxy)methyl - 11b,17a,21 - tri - hydroxy - 16 - hydroxymethyl - 1,4 - pregnadiene - 3,20-dione (Compound VIIIf), the corresponding 16-tetrahydropyranyloxymethyl steroid 21-tetrahydropyranylether is hydrolysed with acid as shown above for the formation of Compound VIIIe.

EXAMPLE 1

9a-fluoro-16-acetoxymethyl-3a,11b,17a,21-tetrahydroxypregnan-20-one 21-acetate 41.4 grams of 9a - fluoro - 3a,11b,17a,21 - tetrahydroxy - 16 - hydroxymethylpregnan - 20 - one (0.1 mole) are dissolved in 250 ml. of pyridine and a solution of 22.4 grams of glacial acetic acid (0.22 mole) in 50 ml. of pyridine added thereto. The mixture is stirred vigorously for 12 hours, and the volatile components distilled off under reduced pressure, the residue is partitioned between water and ethylacetate, the ethylacetate layer separated and washed with saturated aqueous sodium bicarbonate solution dried over sodium sulfate, and the solvent removed under reduced pressure to yield the desired 9a - fluoro - 16 - acetoxymethyl - 3a,11b,17a,21-tetrahydroxypregnan-20-one 21-acetate.

EXAMPLE 2

9a-fluoro-16-tetrahydropyranyloxymethyl-3a,11b,17a,21-tetrahydroxypregnan-20-one 21-tetrahydropyranylether 41.4 grams of 9a - fluoro - 3a,11b,17a,21-tetrahydroxy-16 - hydroxymethyl - pregnan - 20 - one (0.1 mole) are taken up. 150 ml. of dry benzene and 22.6 grams of tetrahydropyranyl alcohol and 100 mg. of dry p-toluene sulfonic acid added thereto. The mixture is heated under reflux in such a manner as to continuously remove the benzene water azeotrope formed in the course of the reaction. Such removal may conveniently be carried out, using a Dean and Stark trap. The reaction is carried on for a period of six hours, the reaction mixture cooled, washed with water, the benzene layer dried over sodium sulfate, filtered and evaporated to dryness to yield as a residue the desired 9a - fluoro - 16 - tetrahydropyranyloxymethyl - 3a,11b,17a,21 - tetrahydroxypregnan - 20-one 21 - tetrahydropyranyl ether.

EXAMPLE 3

9a-fluoro-16-acetoxymethyl-3a,11b,17a,21-tetrahydroxy-6-(dihydroxy) methylpregnan-20-one 21-acetate 4.8 grams of Raneycobalt in 145 ml. of ether are heated in an autoclave under 3,200 p.s.i. pressure of carbonmonoxide for a period of five hours at 150° C. Upon cooling and release of pressure, there is obtained a solution containing 8.9 grams of cobalt carbonyl.

5 grams of 9a-fluoro-16-acetoxymethyl-3a,11b,17a, 21-tetrahydroxy-pregnan-20 one-21-acetate, a solution containing 2.2 grams of cobalt carbonyl and 100 ml. of ethanol are placed in an autoclave and subjected to a pressure of 3,200 p.s.i. of carbon monoxide and hydrogen added thereto to increase the pressure to a total pressure of 4,800 p.s.i. The mixture is shaken for 15 minutes and heated slowly to 100° C. with agitation. The mixture is maintained at this temperature for 15 minutes, cooled to room temperature, and pressure released. The reaction mixture is clarified by filtration, the solvents removed from the filtrate by evaporation under reduced pressure and the residue recrystallized from ethanol to yield 9a-fluoro-16-acetoxymethyl - 3a,11b, 17a,21 - tetrahydroxy-6-(dihydroxy)methylpregnan-20 one 21-acetate.

*Note*: Due to the extremely poisonous nature of the reactants in this example, namely, cobalt carbonyl and carbon monoxide, this reaction must be carried out under conditions of adequate ventilation which ensure safe and complete removal of the poisonous reactants.

In accordance with the above procedure, but using in place of 9a-fluoro-16-acetoxymethyl-3a,11b,17a 21-tetrahydropyranylmethyloxy steroid 21 - tetrahydropyranyl ether, there is similarly obtained the corresponding 16-tetrahydropyranyloxymethyl-6-(dihydroxy)methyl steroid 21-tetrahydropyranyl ether.

EXAMPLE 4

9a-fluoro-6-(diacetoxy)methyl-3a,11b,17a - trihydroxy-16-hydropyranyloxymethyl - pregnan-20-one 21 - tetrahydropyranyl ether.

51.7 grams of 9a-fluoro-3a,11b,17a-trihydroxy-6 di(hydroxy)methyl - 16 - tetrahydropyranyloxymethylpregnan-20-one 21-tetrahydropyranyl ether are taken up in 1000 ml. of pyridine and 22 grams of acetic anhydride added thereto. The mixture is allowed to stand at room temperature for 48 hours, the solvents removed under reduced pressure and the residue partitioned between water and ethyl acetate. The ethyl acetate layer is washed with saturated sodium bicarbonate, dried over sodium sulfate, filtered, and evaporated to yield the desired 9a-fluoro-6-(diacetoxy)methyl - 3a,11b,17a-trihydroxy-16-tetrahydropyranyloxymethylpregnan-20-one 21 - tetrahydropyranyl ether.

EXAMPLE 5

9a-fluoro-16-acetoxymethyl-6-(diethoxy)methyl-3a,11b,17a,21-tetrahydroxypregnan-20-one 21-acetate 9a - fluoro - 16 - acetoxymethyl-3a,11b,17a,21-tetrahydroxy-6-dihydroxymethyl-pregnan-20-one 21-acetate (0.1 mole) is taken up in 500 ml. of dry benzene and 10.3 grams of ethanol (0.22 mole) and 100 mg. of toluenesulfonic acid added thereto. The mixture is heated under reflux, suitably with a Dean and Stark trap so as to remove the benzene water azeotrope as it is formed. After 12 hours, when the distillation of the azeotrope has ceased, the reaction mixture is cooled, washed with water, and the benzene layer dried, and evaporated under reduced pressure to yield the desired 9a-fluoro-16-acetoxymethyl-6-(diethoxy)methyl - 3a,11b,17a - tetrahydroxypregnan-20-one 21-acetate.

EXAMPLE 6

9a - fluoro - 6 - (diacetoxy)methyl-3a,11b,17a,21-tetrahydroxy - 16 - tetrahydropyranyloxymethylpregnan - 3,20-dione 21-tetrahydropyranylether 6 grams of 9a-fluoro-6-(diacetoxy)methyl-3a,11b,17a,21-tetrahydroxy-16 tetrahydropyranyloxymethyl-pregnan-20-one 21-tetrahydropyranyl ether, 80 ml. of cyclohexanone are taken up in 100 ml. of toluene and 5 grams of aluminum isopropoxide in 25 ml. of toluene added and heated under reflux for 45 minutes. The reaction is cooled, quenched with very dilute aqueous hydrochloric acid, and the toluene layer separated, dried over sodium sulfate, filtered and evaporated to dryness to yield the desired 9a-fluoro - 6 - (diacetoxy)methyl - 11b,17a,21-trihydroxy-16-tetrahydropyranyloxymethyl-pregnan-3,20-dione 21-tetrahydropyranyl ether.

In accordance with the above procedure but using as the starting steroid 9a-fluoro-16-acetoxymethyl-6-(diethoxy)methyl - 3a,11b,17a,21 - tetrahydroxy-pregnan-20-one 21-acetate, there is obtained the corresponding 9a-fluoro-16-acetoxymethyl-6-(diethoxy)methyl-pregnan-3,20 dione 21-acetate.

EXAMPLE 7

9a - fluoro - 4ζ - bromo - 6 - (diacetoxy)methyl-16-tetrapyranyloxymethyl - 11b,17a,21 - trihydroxypregnane-3,20-dione 21-tetrahydropyranyl ether.

3.1 grams of 9a-fluoro-6-(diacetoxy)methyl-16-tetrahydropyranyloxymethyl - 11b,17a,21 - trihydroxy-pregnan-3,20-dione 21-tetrahydropyranyl ether is taken up in 100 ml. of glacial acetic acid. A solution of 3 ml. of 0.257 M bromine in glacial acetic acid is added thereto and the mixture agitated. There is then added a further portion of 28.8 ml. of 0.257 M bromine in glacial acetic acid buffered with an equivalent molar amount of sodium acetate. The mixture is stirred for 30 minutes and solvents removed under reduced pressure, and the residue taken up in ethyl acetate. The ethyl acetate layer is washed with saturated aqueous sodium chloride solution, 0.1 N aqueous sodium hydroxide solution, and again with sodium chloride solution. The ethyl acetate is then removed under reduced pressure to yield the desired 9a-fluoro-4ζ-bromo-6-(diacetoxy)methyl-16-tetrapyranyloxymethyl - 11b,17a,21-trihydroxy-pregnane-3,20-dione-21 - tetrahydropyranyl ether.

In accordance with the above procedure but utilizing as the starting steroid 9a-fluoro-16-acetoxymethyl-6-(diethoxy)methyl - 11b,17a,21-trihydroxypregnan-3,20-dione 21 acetate, there is similarly obtained the corresponding 4ζ-bromo-steroid.

EXAMPLE 8

9a - fluoro-6-(diacetoxy)methyl - 16 - tetrahydropyranyloxymethyl - 11b,17a,21 - trihydroxy - 4 - pregnene-3,20-dione 21-tetrahydropyranyl ether 6.92 grams 9a-fluoro-4ζ-bromo-6-(diacetoxy)methyl-16-tetrapyranyloxymethyl-11b,17a,21 - trihydroxy - pregnane-3,20-dione 21-tetrahydropyranyl ether, 4.8 grams of semi-carbazide hydrochloride and 4.8 grams of sodium acetate are taken up in 1250 ml. of 98 percent acetic acid and heated at 70° C. for 2 hours in an atmosphere of nitrogen. The mixture is cooled, 70 ml. of pyruvic acid in 140 ml. of water added and the mixture heated at 70° for a further two hours similarly in a nitrogen atmosphere. The mixture is concentrated and extracted with ethyl acetate, and the ethyl acetate layer extracted with dilute aqueous sodium hydroxide solution followed by 5 percent aqueous sodium chloride solution. Evaporation of the ethyl acetate solution yields 9a-fluoro-6-(diacetoxy)-methyl-16-tetrahydropyranyloxymethyl - 11b,17a,21-trihydroxy-4-pregnene-3,20-dione 21-tetrahydropyranyl ether.

In accordance with the above procedure but utilizing as the starting steroid, 9a-fluoro-16-acetoxymethyl-4ζ-bromo-6(diethoxy)methyl - 11b,17a,21-trihydroxypregnane-3,20 dione 21-acetate, there is obtained the corresponding 4-pregnene.

EXAMPLE 9

9a - fluoro-6-(diacetoxy)methyl-16-tetrahydropyranyloxymethyl - 11b,17a,21-trihydroxy-1,4-pregnadiene-3,20-dione 21-tetrahydropyranyl ether A 100 ml. broth culture containing a 0.1% yeast extract concentration, 9.0 ml. of 0.2 M $KH_2PO_4$ and 9.0 ml. of 0.2 M $Na_2HPO_4$ is seeded with 1 ml. of a 1.0% inoculum from a 24 hour broth culture of *Corynebacterium simplex* (A.T.C.C. 6946). The flask is incubated at 28° C. for 24 hours. A second 300 ml. Erlenmeyer flask containing 150 mg. of sterile 9a-fluoro-6-(diacetoxy) methyl - 16 - tetrahydropyranyloxymethyl-11b,17a,21-trihydroxy - 4 - pregnene-3,20-dione 21-tetrahydropyranyl ether in 5.0 ml. acetone is inoculated with the 24-hour culture of *Corynebacterium simplex* (A.T.C.C. 6946). The culture-containing steroid solution is incubated for 48 hours at 28° C. to 30° C.

After termination of the transformation period, the pH is 7.2–7.3. The culture is now directly extracted with 3 equal volumes of $CHCl_3$, the solvent volumes combined and concentrated to dryness on a steam bath. The crude extract weighs 153.0 mg.

The total crude is recrystallized from methanol to yield 9a - fluoro-6-(diacetoxy)methyl-11b,17a,21-trihydroxy-16 - tetrahydropyranyloxymethyl - 1,4-pregnadiene-3,20-dione 21-tetrahydropyranyl ether.

In accordance with the above procedure, but using as a starting steroid 9a-fluoro-16-acetoxymethyl-6-(diethoxy) methyl - 11b,17a,21-trihydroxy-4-pregnene-3,20-dione 21-acetate, there is obtained the corresponding 9a-fluoro-16-acetoxymethyl - 6(diethoxy)methyl - 11b,17a,21 - trihydroxy-1,4-pregnadiene-3,20-dione 21-acetate.

EXAMPLE 10

9a - fluoro - 6-(diacetoxy)methyl-11b,17a,21-trihydroxy-16-hydroxymethyl-1,4-pregnadiene-3,20 dione 10 grams of 9a-fluoro-6-(diacetoxy)methyl-16-tetrahydropyranyloxymethyl - 11b,17a,21-trihydroxy-1,4-pregnadiene-3,20 dione 21-tetrahydropyranyl ether are taken up in benzene (200 ml.) and agitated for 6 hours with 50 ml. of concentrated (5 N) aqueous hydrochloric acid. The benzene solution is separated, washed with sodium bicarbonate solution, dried and the solvent removed under reduced pressure to yield the desired 9a-fluoro-6-(diacetoxy)methyl - 11b,17a,21 - trihydroxy - 16-hydroxymethyl-1,4 pregnadiene-3,20-dione.

EXAMPLE 11

9a - fluoro - 11b,17a,21-trihydroxy-6-(dihydroxy)methyl 16-hydroxymethyl-1,4-pregnadiene-3,20-dione 9a - fluoro-6-(diacetoxy)methyl-11b,17a,21-trihydroxy-16 - tetrahydropyranyloxymethyl - 1,4-pregnadiene-3,20-dione 21-tetrahydropyranylether is taken up in 500 ml. of methanol and 6 g. of sodium methoxide added thereto. The mixture is heated under reflux for 24 hours, cooled, and evaporated to dryness under reduced pressure. The residue is then partitioned between ethyl acetate, and the minimum quantity of water required to dissolve the residue. 100 ml. of 5 N hydrochloric acid are added, and the mixture agitated at room temperature for six hours. The ethyl acetate layer is separated, washed with water, dried, and evaporated under reduced pressure to yield the desired 9a - fluoro - 11b,17a,21 - trihydroxy-6-(dihydroxy) methyl - 16 - hydroxymethyl-1,4-pregnadiene-3,20 dione. M.P. 268° (Max: 239 mμ [$\epsilon$=12800] [$\alpha$]$_D^{25}$+65° (c.=1 in $CHCl_3$).

In accordance with the above procedure, but utilizing as the starting steroid, 9a-fluoro-16-acetoxymethyl-6-(diethoxy)methyl - 11b,17a,21-trihydroxy-1,4-pregnadiene-3,20-dione 21-acetate, there is obtained the corresponding 9a-fluoro-6-(diethoxy)methyl-11b,17a,21-trihydroxy-16-hydroxymethyl-1,4-pregnadiene-3,20-dione.

The following are examples of pharmaceutical compositions prepared in accordance with the invention and containing as the active hormone substance a 1,4-pregnadiene compound (preferably an anti-inflammatory compound) of my invention:

Example A:                                                       Mg./tab.
   9a - fluoro - 11b,17a,21-trihydroxy-16-hy-
     droxymethyl - 6 - dihydroxymethyl-1,4-
     pregnadiene 3,20-dione _____ 5.00
   Lactose _____ 83.85
   Starch _____ 9.50
   Gelatin _____ 1.19
   Magnesium stearate _____ 0.46

This mixture provides a tablet for oral use in the treatment of rheumatoid arthritis and kindred conditions. The quantity of steroid may be increased to about 30 mg. per tablet but for tri-daily administration, 5 to 10 mg. for each administration is usually sufficient as maintenance does.

Example B:                                                       Mg./tab.
   9a - fluoro - 11b,17a,21 - trihydroxy-16-hy-
     droxymethyl - 6-(diacetoxy)methyl-1,4-
     pregnadiene 3,20-dione _____ 5.0
   Acetophenetidin _____ 162.0
   Caffeine, anhydrous _____ 32.0
   Acetylalicyclic acid _____ 227.67
   Gelatin _____ 5.0
   Corn starch _____ 55.33
   Stearic acid _____ 3.0

This mixture provides a tablet for oral use in rheumatoid arthritis.

Example C:                                                       Mg./ml.
   9a - fluoro - 11b,17a,21-trihydroxy-16-hy-
     droxymethyl - 6-(diethoxy)methyl - 1,4-
     pregnadiene 3,20-dione _____ 5.0
   Potassium dihydrogen phosphate, C.P.
     ($KH_2PO_4$) _____ 6.0
   Disodium hydrogen phosphate, C.P. anh.
     ($Na_2HPO_4$) _____ 12.0
   Polysorbate 80, U.S.P. (Tween 80—
     Atlas) _____ 0.4
   Sorbitan monolaurate (Span 20—Atlas) __ 0.4
   Thimerosal, N.F. (Merthiolate—Lilly) __ 0.1
   Water for injection U.S.P. to make 1.00 ml.

This aqueous suspension is suitable for subcutaneous and intramuscular injection.

Example D:                                                       Mg./ml.
   9a - fluoro - 11b,17a,21 - trihydroxy-16-hy-
     droxymethyl - 6 - dihydroxymethyl-1,4-
     pregnadiene 3,20-dione _____ 5.0
   Chloroprophenpyridamine gluconate,
     Shering _____ 3.0
   D-sorbitol _____ 43.0
   Benzalkonium chloride U.S.P. _____ 0.25
   Distilled water to make 1.0 ml.

The above mixture can be applied as a nasal spray.

Example E:                                                       Mg./ml.
   9a - fluoro - 11b, 17a,21 - trihydroxy - 16 - hy-
     droxymethyl - 6 - (diacetoxy)methyl - 1,4-
     pregnadiene 3,20-dione _____ 5.0
   Aluminum monostearate _____ 20.0
   Propylparaben, U.S.P. _____ 1.0
   Sesame oil, U.S.P. to make 1.0 ml.

This oil suspension can be injected intramuscularly or subcutaneously.

Example F:                                                       Mg./g.
   9a - fluoro - 11b,17a,21 - trihydroxy - 16 - hy-
     droxymethyl - 6 - (diethoxy)methyl - 1,4-
     pregnadiene 3,20-dione _____ 5.0
   Zinc stearate, U.S.P. _____ 60.9
   Polyethylene glycol 6000 (Carbowax 6000) _ 122.0
   Polyethylene glycol 1500 (Carbowax 1500)__ 421.3
   Propylene glycol, U.S.P. _____ 345.2
   Distilled water _____ 45.6

This mixture forms a creamy composition for topical use.

Example G:                                                       Mg./g.
   9a - fluoro - 11b,17a,21 - trihydroxy - 16 - hy-
     droxymethyl - 6 - dihydroxymethyl - 1,4-
     pregnadiene 3,20-dione _____ 5.0
   Neomycin sulfate _____ 5.0
   Propylene glycol, U.S.P. _____ 345.2
   Zinc stearate, U.S.P. _____ 60.0
   Polyethylene glycol 6000 (Carbowax 6000)__ 122.0
   Polyethylene glycol 1500 (Carbowax 1500) _ 421.3
   Distilled water _____ 40.6

This is likewise a cream for topical use, but is also antibacterial in character.

Example H:                                                       Mg./g.
   9a - fluoro - 11b,17a21 - trihydroxy - 16 - hy-
     droxymethyl - 6 - (diacetoxy)methyl - 1,4-
     pregnadiene 3,20-dione _____ 5.0
   Tetracycline hydrochloride _____ 30.0
   Neomycin sulfate _____ 5.0
   Zinc Stearate, U.S.P. _____ 60.9
   Polyethylene glycol 6000 (Carbowax 6000) _ 122.0
   Polyethylene glycol 1500 (Carbowax 1500) _ 421.3
   Propylene glycol, U.S.P. _____ 345.2
   Distilled water _____ 40.6

The above mixture yields a cream suitable for topical application.

What is claimed is:

1. A compound of the following structural formula:

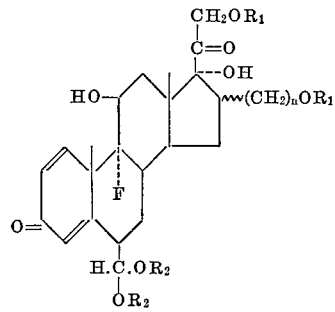

Wherein, $R_1$ and $R_2$ are hydrogen, lower alkanoyl, or lower alkyl, wherein said alkanoyl or alkyl groups contain from 1 to 6 carbon atoms, and wherein $R_1$ and $R_2$ may be the same or different.

$n$ is 0 or 1.

2. A compound of the following structural formula:

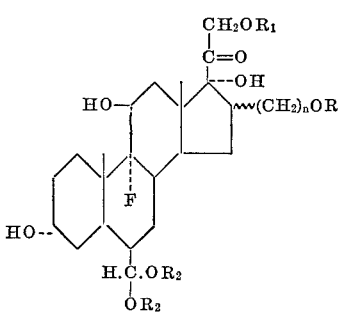

Wherein, $R_1$ and $R_2$ are hydrogen, lower alkanoyl, or lower alkyl, wherein said alkanoyl or alkyl groups contain from 1 to 6 carbon atoms, and wherein $R_1$ and $R_2$ may be the same or different.

$n$ is 0 or 1.

3. A compound of claim 1, having the designation 9a - fluoro - 11b,17a,21 - trihydroxy - 6 - (dihydroxy)methyl - 16 - hydroxymethyl - 1,4 - pregnadiene - 3,20-dione.

4. A compound of claim 1, having the designation 9a - fluoro - 6 - (diloweralkanoyloxy)methyl - 11b,17a,21 - trihydroxy - 16 - hydroxymethyl - 1,4 - pregnadiene-3,20-dione.

5. A compound of claim 1, having the designation 9a - fluoro - 6 - (diloweralkoxy)methyl - 11b,17a,21-trihydroxy - 16 - hydroxymethyl - 1,4, - pregnadiene - 3,20-dione.

6. A compound of claim 1, having ahe designation 9a - fluoro - 6 - (diacetoxy)methyl - 11b,17a,21 - trihydroxy - 16 - hydroxymethyl - 1,4 - pregnadiene - 3,20-dione.

7. A compound of claim 1, having the designation 9a - fluoro - 6 - (diethoxy)methyl - 11b,17a,21 - trihydroxy - 16 - hydroxymethyl - 1,4 - pregnadiene - 3,20-dione.

8. A compound of claim 2, having the designation 9a - fluoro - 3a,11b,17a,21 - tetrahydroxy - 6 - (dihydroxy)methyl - 16 - hydroxymethylpregnan - 20 - one.

References Cited

UNITED STATES PATENTS 3,375,167   3/1968   Burn et al.

HENRY A. FRENCH, Primary Examiner

U.S. Cl. X.R.

195—51; 260—239.55